United States Patent
Gafni et al.

(10) Patent No.: US 11,005,770 B2
(45) Date of Patent: May 11, 2021

(54) LISTING CONGESTION NOTIFICATION PACKET GENERATION BY SWITCH

(71) Applicant: MELLANOX TECHNOLOGIES TLV LTD., Raanana (IL)

(72) Inventors: Barak Gafni, Campbell, CA (US); Eitan Zahavi, Zichron Yaakov (IL); Gil Levy, Hod Hasharon (IL); Aviv Kfir, Nili (IL); Liron Mula, Ramat Gan (IL)

(73) Assignee: MELLANOX TECHNOLOGIES TLV LTD., Raanana (IL)

( * ) Notice: Subject to any disclaimer, the term of this patent is extended or adjusted under 35 U.S.C. 154(b) by 0 days.

(21) Appl. No.: 16/442,508

(22) Filed: Jun. 16, 2019

(65) Prior Publication Data

US 2020/0396170 A1    Dec. 17, 2020

(51) Int. Cl.
| | |
|---|---|
| H04W 72/04 | (2009.01) |
| H04L 12/835 | (2013.01) |
| H04L 12/825 | (2013.01) |
| H04L 12/801 | (2013.01) |

(52) U.S. Cl.
CPC .......... *H04L 47/30* (2013.01); *H04L 47/263* (2013.01); *H04L 47/35* (2013.01)

(58) Field of Classification Search
CPC ........ H04L 47/30; H04L 47/263; H04L 47/35
See application file for complete search history.

(56) References Cited

U.S. PATENT DOCUMENTS

| | | | |
|---|---|---|---|
| 6,108,713 A | 8/2000 | Sambamurthy et al. | |
| 6,178,448 B1 | 1/2001 | Gray et al. | |
| 6,594,263 B1 | 7/2003 | Martinsson et al. | |
| 6,625,118 B1 * | 9/2003 | Hadi Salim | H04L 12/5602 |
| | | | 370/229 |

(Continued)

FOREIGN PATENT DOCUMENTS

| | | |
|---|---|---|
| EP | 1720295 A1 | 11/2006 |
| EP | 2466476 A1 | 6/2012 |

(Continued)

OTHER PUBLICATIONS

Supplement to InfiniBandTM Architecture Specification vol. 1 Release 1.2.1, Annex A17: RoCEv2, pp. 1-23, Sep. 2, 2014.

(Continued)

*Primary Examiner* — Hassan Kizou
*Assistant Examiner* — Mahbubul Bar Chowdhury
(74) *Attorney, Agent, or Firm* — Kligler & Associates Patent Attorneys Ltd

(57) ABSTRACT

Network communication is carried out by sending packets from a source network interface toward a destination network interface, receiving one of the packets in an intermediate switch of the network, determining that the intermediate switch is experiencing network congestion, generating in the intermediate switch a congestion notification packet for the received packet, and transmitting the congestion notification packet from the intermediate switch to the source network interface via the network. The received packet is forwarded from the intermediate switch toward the (Continued)

destination network interface. The source network interface may modify a rate of packet transmission responsively to the congestion notification packet.

10 Claims, 4 Drawing Sheets

(56) References Cited

U.S. PATENT DOCUMENTS

| | | | |
|---|---|---|---|
| 7,321,553 | B2 | 1/2008 | Prasad et al. |
| 7,346,059 | B1 | 3/2008 | Garner et al. |
| 7,738,454 | B1 | 6/2010 | Panwar et al. |
| 7,821,939 | B2 | 10/2010 | Decusatis et al. |
| 8,023,413 | B2 | 9/2011 | Kadambi et al. |
| 8,078,743 | B2 | 12/2011 | Sharp et al. |
| 8,345,548 | B2 | 1/2013 | Gusat et al. |
| 8,473,693 | B1 | 6/2013 | Muppalaneni et al. |
| 8,576,715 | B2 | 11/2013 | Bloch et al. |
| 8,630,294 | B1 | 1/2014 | Keen et al. |
| 8,767,561 | B2 | 7/2014 | Gnanasekaran et al. |
| 8,804,529 | B2 | 8/2014 | Bergamasco et al. |
| 8,811,183 | B1 | 8/2014 | Anand et al. |
| 8,879,396 | B2 | 11/2014 | Guay et al. |
| 8,989,017 | B2 | 3/2015 | Naouri et al. |
| 8,995,265 | B2 | 3/2015 | Basso et al. |
| 9,014,006 | B2 | 4/2015 | Haramaty et al. |
| 9,325,619 | B2 | 4/2016 | Guay et al. |
| 9,356,868 | B2 | 5/2016 | Tabatabaee et al. |
| 9,426,085 | B1 | 8/2016 | Anand et al. |
| 9,648,148 | B2 | 5/2017 | Rimmer et al. |
| 9,660,914 | B1* | 5/2017 | Zhou ............... H04L 43/062 |
| 10,389,646 | B2 | 8/2019 | Zdornov et al. |
| 2002/0055993 | A1 | 5/2002 | Shah et al. |
| 2002/0141427 | A1 | 10/2002 | McAlpine |
| 2002/0191559 | A1 | 12/2002 | Chen et al. |
| 2003/0108010 | A1 | 6/2003 | Kim et al. |
| 2003/0223368 | A1 | 12/2003 | Allen, Jr. et al. |
| 2004/0008714 | A1 | 1/2004 | Jones |
| 2004/0148423 | A1* | 7/2004 | Key ............... H04L 47/25 709/235 |
| 2005/0053077 | A1 | 3/2005 | Blanc et al. |
| 2005/0216822 | A1 | 7/2005 | Kyusojin et al. |
| 2005/0169172 | A1 | 8/2005 | Wang et al. |
| 2005/0226156 | A1 | 10/2005 | Keating et al. |
| 2005/0228900 | A1 | 10/2005 | Stuart et al. |
| 2006/0008803 | A1 | 1/2006 | Brunner et al. |
| 2006/0015639 | A1* | 1/2006 | Taylor ............... H04L 47/781 709/235 |
| 2006/0087989 | A1 | 4/2006 | Gai et al. |
| 2006/0092837 | A1 | 5/2006 | Kwan et al. |
| 2006/0092845 | A1 | 5/2006 | Kwan et al. |
| 2007/0097257 | A1 | 5/2007 | El-Maleh et al. |
| 2007/0104102 | A1 | 5/2007 | Opsasnick |
| 2007/0104211 | A1 | 5/2007 | Opsasnick |
| 2007/0201499 | A1 | 8/2007 | Kapoor et al. |
| 2007/0291644 | A1 | 12/2007 | Roberts et al. |
| 2008/0025217 | A1 | 1/2008 | Gusat et al. |
| 2008/0037420 | A1 | 2/2008 | Tang et al. |
| 2008/0175146 | A1 | 7/2008 | Van LeekWuck et al. |
| 2008/0192764 | A1 | 8/2008 | Arefi et al. |
| 2009/0052326 | A1* | 2/2009 | Bergamasco ......... H04L 47/33 370/236 |
| 2009/0207848 | A1 | 8/2009 | Kwan et al. |
| 2010/0088437 | A1 | 4/2010 | Zahavi |
| 2010/0220742 | A1 | 9/2010 | Brewer et al. |
| 2012/0051216 | A1* | 3/2012 | Zhang ............... H04L 47/14 370/230 |
| 2012/0063493 | A1* | 3/2012 | Hasegawa ......... H04L 47/263 375/211 |
| 2012/0300669 | A1 | 11/2012 | Zahavi |
| 2013/0014118 | A1 | 1/2013 | Jones |
| 2013/0039178 | A1 | 2/2013 | Chen et al. |
| 2013/0135999 | A1 | 5/2013 | Bloch et al. |
| 2013/0250757 | A1 | 9/2013 | Tabatabaee et al. |
| 2013/0250762 | A1 | 9/2013 | Assarpour |
| 2013/0275631 | A1 | 10/2013 | Magro et al. |
| 2013/0286834 | A1 | 10/2013 | Lee |
| 2013/0305250 | A1 | 11/2013 | Durant |
| 2014/0133314 | A1 | 5/2014 | Matthews et al. |
| 2014/0269274 | A1 | 9/2014 | Banavalikar et al. |
| 2014/0269324 | A1 | 9/2014 | Tietz et al. |
| 2015/0055478 | A1 | 2/2015 | Tabatabaee et al. |
| 2015/0103667 | A1 | 4/2015 | Elias et al. |
| 2015/0124611 | A1 | 5/2015 | Attar et al. |
| 2015/0127797 | A1 | 5/2015 | Attar et al. |
| 2015/0180782 | A1 | 6/2015 | Rimmer et al. |
| 2015/0195202 | A1* | 7/2015 | Ogura ............... H04W 28/0247 370/236 |
| 2015/0200866 | A1 | 7/2015 | Pope et al. |
| 2015/0282003 | A1 | 10/2015 | Noerpel et al. |
| 2015/0026361 | A1 | 11/2015 | Matthews et al. |
| 2015/0381505 | A1* | 12/2015 | Sundararaman ........ H04L 49/10 370/235 |
| 2016/0135076 | A1 | 5/2016 | Grnshpun et al. |
| 2016/0294696 | A1 | 10/2016 | Gafni et al. |
| 2016/0344636 | A1 | 11/2016 | Elias et al. |
| 2017/0118108 | A1 | 4/2017 | Avci et al. |
| 2017/0142020 | A1 | 5/2017 | Sundararaman et al. |
| 2017/0180261 | A1 | 6/2017 | Ma et al. |
| 2017/0187641 | A1 | 6/2017 | Lundqvist et al. |
| 2017/0295112 | A1 | 10/2017 | Cheng et al. |
| 2018/0205653 | A1 | 7/2018 | Wang et al. |
| 2019/0116126 | A1* | 4/2019 | Shen ............... H04L 47/263 |
| 2019/0342199 | A1* | 11/2019 | Hurson ............... H04L 43/16 |

FOREIGN PATENT DOCUMENTS

| | | |
|---|---|---|
| WO | 2009107089 A2 | 9/2009 |
| WO | 2013136355 A1 | 9/2013 |
| WO | 2013180691 A1 | 12/2013 |

OTHER PUBLICATIONS

Mahalingam et al., "Virtual eXtensible Local Area Network (VXLAN): A Framework for Overlaying Virtualized Layer 2 Networks over Layer 3 Networks", Request for Comments: 7348, pp. 1-44, Aug. 2014.

* cited by examiner

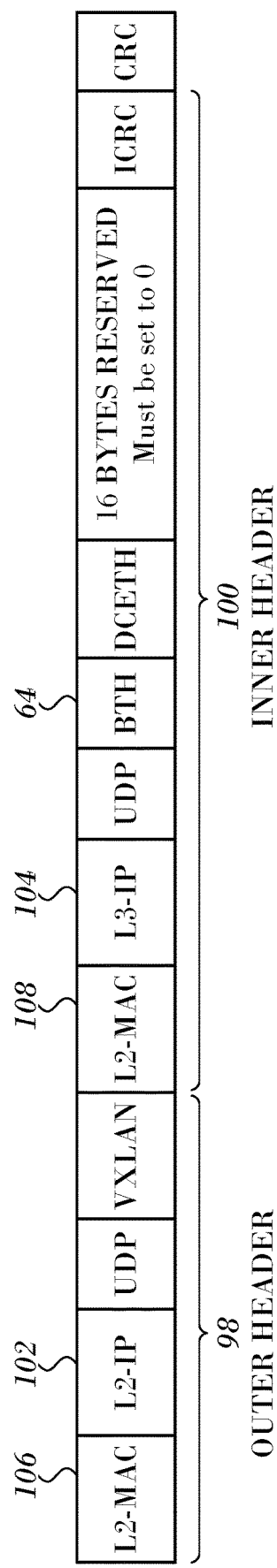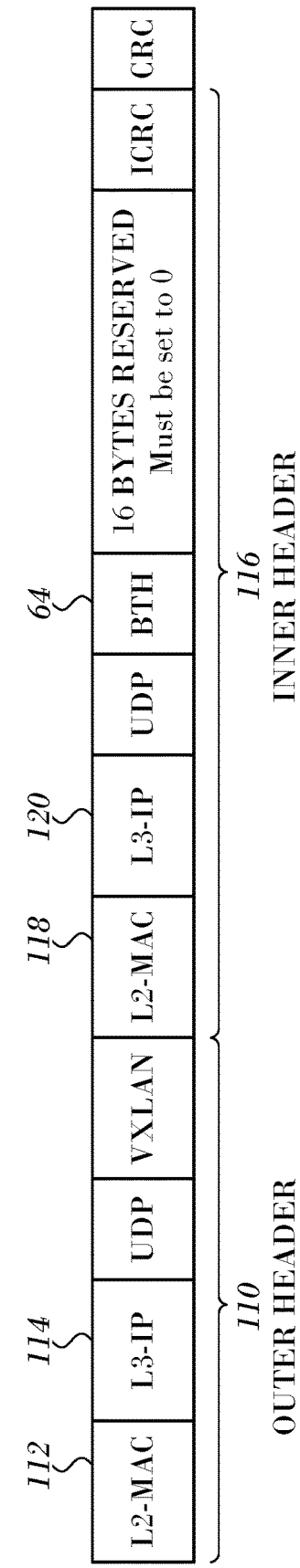

LISTING CONGESTION NOTIFICATION PACKET GENERATION BY SWITCH

COPYRIGHT NOTICE

A portion of the disclosure of this patent document contains material that is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

BACKGROUND OF THE INVENTION

1. Field of the Invention

This invention relates to transmission of digital information over packet switching networks. More particularly, this invention relates to congestion management in packet switching networks.

2. Description of the Related Art

The meanings of certain acronyms and abbreviations used herein are given in Table 1.

TABLE 1

Acronyms and Abbreviations

| | |
|---|---|
| ASIC | Application-Specific Integrated Circuit |
| BTH | Base Transport Header |
| CNP | Congestion Notification Packet |
| DC | Dynamically Connected |
| DIP | Destination IP Address |
| DSCP | Differentiated Services Code Point |
| ECN | Explicit Congestion Notification |
| FPGA | Field-Programmable Gate Array |
| HCA | Host Channel Adapter |
| IETF | Internet Engineering Task Force |
| IP | Internet Protocol |
| IPv4 | Internet Protocol version 4 |
| IPv6 | Internet Protocol version 6 |
| LAN | Local Area Network |
| MAC | Media Access Control |
| NIC | Network Interface Controller |
| QoS | Quality of Service |
| QP | Queue Pair |
| RCM | RoCEV2 Congestion Management |
| RD | Reliable Datagram |
| RDMA | Remote Direct Memory Access |
| RoCE | RDMA over Converged Ethernet |
| RoCEV2 | An extension of the RoCE protocol |
| RTT | Round Trip Time |
| SIP | Source IP Address |
| UD | Unreliable Datagram |
| VXLAN | Virtual Extensible LAN |
| WRED | Weighted Random Early Detection |

RDMA is a direct memory access from the memory of one computer into that of other without involving either one's operating system. One common network RDMA protocol is RDMA over Converged Ethernet (RoCE). RoCEV2 is an extension of the RoCE protocol. Its specification is found in the document, *Supplement to InfiniBand™ Architecture Specification*, Volume 1, Release 1.2.1, Annex A17 (RoCEV2), which is herein incorporated by reference.

Current high-performance applications inject increasingly unpredictable bursty traffic into the data center networks that cause network congestion and degrade network and application performance. Current congestion control protocols indicate traffic sources that contribute to the congestion in the network. Using the indication, the traffic sources reduce the injection rate of the traffic. The performance of the congestion control mechanism depends on several factors, for example notification delay and accuracy of notification.

RoCEv2 Congestion Management (RCM) enables avoidance of congestion hot spots and optimizes the throughput of the fabric. With RCM, incipient congestion in the fabric is eventually reported back to the sources of traffic that in turn react by throttling down their injection rates, thus preventing the negative effects of fabric buffer saturation and increased queuing delays. Conventional RoCEV2 congestion control relies on explicit congestion notification (ECN), in which a switch marks the packet, and on a congestion notification packet (CNP) sent by the packet destination node to the packet source node. Commonly assigned U.S. Patent Application Publication No. 2013/0135999 by Bloch et al., which is herein incorporated by reference, discloses congestion management of this sort implemented in InfiniBand networks by nodes employing host channel adapters.

SUMMARY OF THE INVENTION

The invention disclosed here presents congestion control protocol with better performance than its known competitors. In order to reduce notification delay the congested switch generates a CNP and sends it upstream through the fabric to the packet source node. The motivation is to shorten the control loop of the congestion control by avoiding a downstream segment between the congested switch and the packet destination node. Better congestion performance of the congestion control algorithm results. Shortening the congestion control loop becomes more and more beneficial as the distance between the nodes increases, e.g., in long haul RoCE where the RTT is very long. In embodiments of the invention the destination packet node is not included in the control loop. Rather the CNP is sent from an intermediate node to the packet source node. Application of the principles of the invention is especially efficacious when congestion occurs in data center edge routers and in spine switches of a fabric, because the control loop is maximally shortened in these cases.

There is provided according to embodiments of the invention a method of communication, which is carried out by sending packets over a network from a source network interface toward a destination network interface, receiving one of the packets in an intermediate switch of the network, determining that the intermediate switch is experiencing network congestion, generating in the intermediate switch a congestion notification packet for the received packet, and transmitting the congestion notification packet from the intermediate switch to the source network interface via the network. The method is further carried out responsively to the congestion notification packet by modifying a rate of packet transmission to the destination network interface from the source network interface, and forwarding the received packet from the intermediate switch toward the destination network interface.

One aspect of the method includes prior to forwarding the received packet marking the received packet as ineligible to cause other intermediate switches of the network to generate and transmit new congestion notification packets.

According to a further aspect of the method, the received packet is RoCEV2-compliant.

According to yet another aspect of the method, the received packet is a tunnel packet.

In still another aspect of the method sending and receiving the packets are performed using a source queue pair (source QP) and a destination queue pair (destination QP), wherein generating the congestion notification packet includes obtaining the source QP by maintaining in the intermediate switch a translation table between the destination QP and the source QP.

In an additional aspect of the method generating the congestion notification packet includes calculating a hash function on a destination address and the destination QP of the received packet.

There is further provided according to embodiments of the invention a communication apparatus, including a source network interface and a destination network interface. The source network interface is operative for sending packets over a network toward the destination network interface and the destination network interface is operative for accepting the packets from the source network interface. The apparatus includes an intermediate switch in the network that receives one of the packets. The intermediate switch is operative for determining that it is experiencing network congestion, generating a congestion notification packet for the received packet, transmitting the congestion notification packet to the source network interface via the network, and forwarding the received packet toward the destination network interface. Responsively to the congestion notification packet the source network interface is operative for modifying a rate of packet transmission to the destination network interface.

BRIEF DESCRIPTION OF THE SEVERAL VIEWS OF THE DRAWINGS

For a better understanding of the present invention, reference is made to the detailed description of the invention, by way of example, which is to be read in conjunction with the following drawings, wherein like elements are given like reference numerals, and wherein:

FIG. 5 is a diagram illustrating a tunnel packet header for use in accordance with an embodiment of the invention; and FIG. 6 is a diagram illustrating a tunnel CNP header for use in accordance with an embodiment of the invention.

DETAILED DESCRIPTION OF THE INVENTION

In the following description, numerous specific details are set forth in order to provide a thorough understanding of the various principles of the present invention. It will be apparent to one skilled in the art, however, that not all these details are necessarily always needed for practicing the present invention. In this instance, well-known circuits, control logic, and the details of computer program instructions for conventional algorithms and processes have not been shown in detail in order not to obscure the general concepts unnecessarily.

Documents incorporated by reference herein are to be considered an integral part of the Application except that, to the extent that any terms are defined in these incorporated documents in a manner that conflicts with definitions made explicitly or implicitly in the present specification, only the definitions in the present specification should be considered.

System Description.

Figure 1:
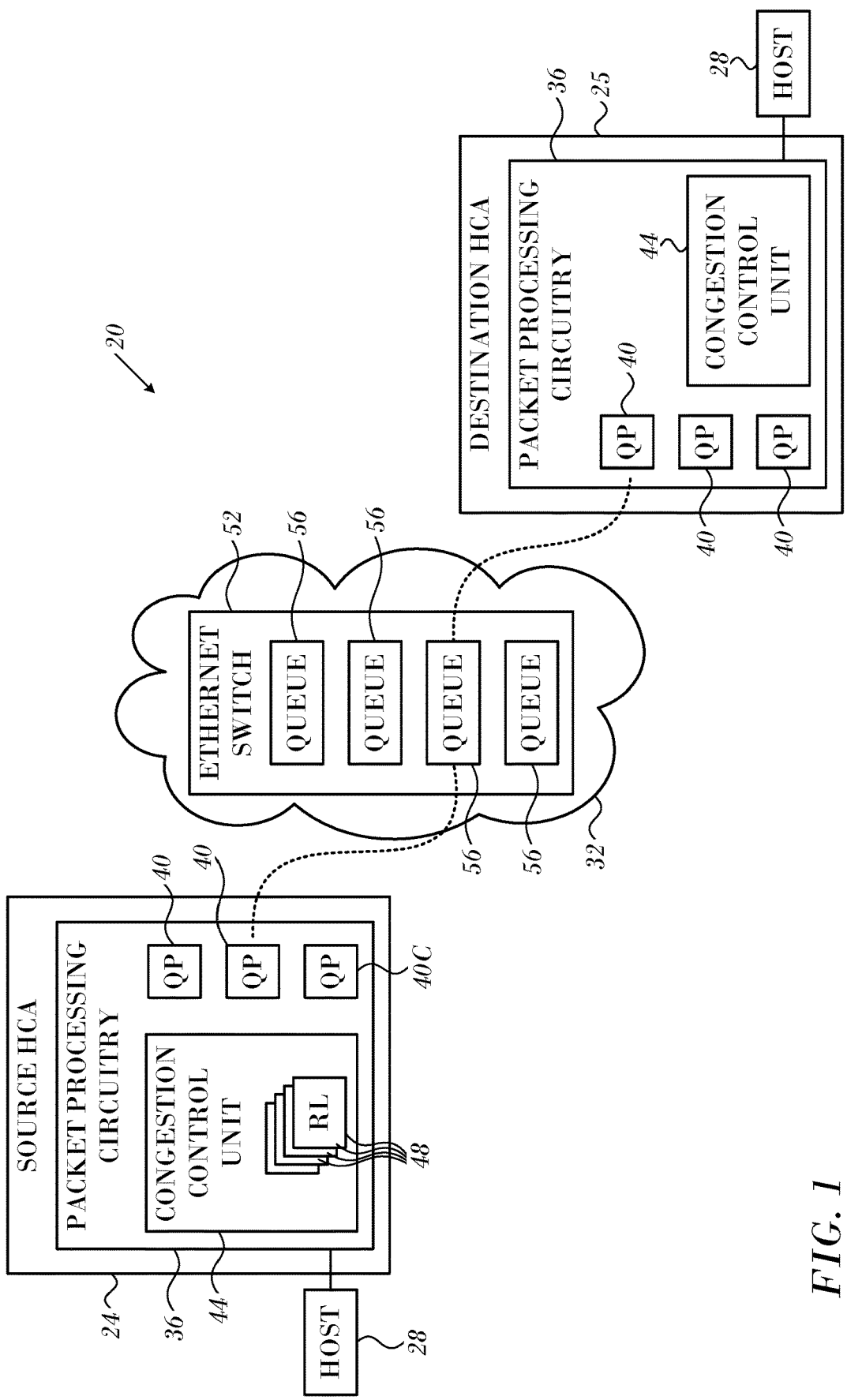
FIG. 1 is a block diagram that schematically illustrates a communication system, in accordance with an embodiment of the present invention.

FIG. 1 is a block diagram that schematically illustrates a communication system 20, in accordance with an embodiment of the present invention. In the present example, system 20 comprises a system, such as an InfiniBand (IB) system, in which two host channel adapters, source HCA 24 and destination HCA 25, communicate over an IB network 32. In alternative embodiments, system 20 may comprise any other suitable network type in which network interface devices, e.g., network interface controllers (NICs) communicate with one another. Each HCA is connected to a respective host 28, such as a computer. The figure shows only two HCAs for the sake of clarity. Real-life systems, however, may comprise a large number of hosts and HCAs. Each HCA comprises packet processing circuitry 36, which sends and receives communication packets so as to communicate between hosts 28. Circuitry 36 comprises one or more queue pairs (QPs) 40. Each QP comprises a send queue and a receive queue (not shown). In a given QP, the send queue queues packets that are pending for transmission from the HCA to network 32, and the receive queue queues packets that were received from the network and are pending for decoding in the HCA. In the present context, each queue pair is regarded as a kind of transport service instance that is used for sending and receiving packets over the network. In alternative embodiments, other suitable types of transport service instances can be used.

Each HCA comprises a congestion control unit 44, which takes measures for mitigating congestion of packets in network 32. Congestion control unit 44 comprises a pool of rate limiters 48 (RL) that regulate the transmission rate of packets. The congestion control methods applied by congestion control unit 44 are described in detail further below.

The example of FIG. 1 refers to packet transmission from HCA 24 to HCA 25. This reference, however, is made purely for the sake of clarity. Typically, each HCA may function as a source HCA for some packets and as a destination HCA for other packets. A given HCA may send packets to multiple HCAs and may receive packets from multiple HCAs. Rate limiters 48 are shown in the figure only for HCA 24 for the sake of clarity, although HCA 25 typically comprises a pool of rate limiters as well.

Packets that are sent from HCA 24 to HCA 25 may traverse various network elements in network 32. In the present example, the packets traverse a certain path in the network that passes through a switch 52. Switch 52 comprises multiple queues 56 that queue the packets traversing the switch, shown representatively in the present example as four queues. In alternative embodiments, the packets may traverse various paths that may each pass through multiple network elements.

The HCAs 24, 25, switch 52 and the system configurations shown in FIG. 1 are exemplary configurations, which are chosen purely for the sake of conceptual clarity. In alternative embodiments, any other suitable HCA, network element and system configurations can be used. Certain elements of HCAs 24, 25 may be implemented using hardware, such as using one or more application-specific integrated circuits (ASICs) or field-programmable gate arrays (FPGAs). Alternatively, some HCA elements may be implemented in software or using a combination of hardware and software elements.

In some embodiments, certain HCA functions may be implemented using a general-purpose computer, which is programmed in software to carry out the functions described herein. In one example embodiment, such functions may be performed by a processor of host 28. The software may be downloaded to the computer in electronic form, over a network, for example, or it may, alternatively or additionally, be provided and/or stored on non-transitory tangible media, such as magnetic, optical, or electronic memory.

In some practical cases, certain components of the network elements in network 32 are loaded with heavy traffic and may cause large delays or even packet loss. In the example of FIG. 1, one or more of queues 56 in switch 52 may be loaded with a large volume of packets. Such scenarios are referred to herein as network congestion. In embodiments of the invention described below, switch 52 applies a congestion control scheme that mitigates network congestion.

Congestion Control Scheme.

Figure 2:
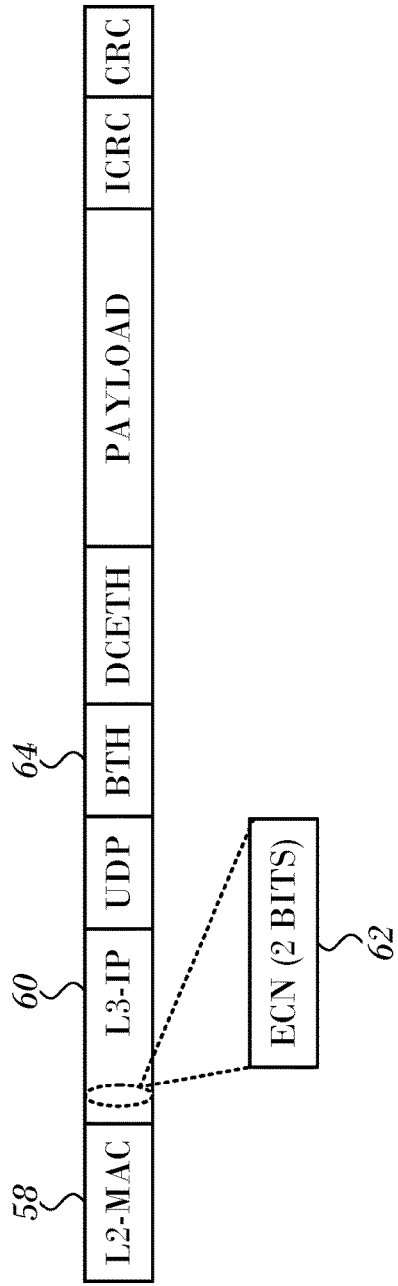
FIG. 2 is a table illustrating the format of a conventional RoCEV2 packet header.

A RoCEV2 packet has the format shown in FIG. 2 that includes L2-MAC segment 58, L3IP segment 60 (IPv 4 or IPv 6) includes a 2-bit ECN field 62 and a base transport header (BTH) 64. The meaning of the bits in the ECN field 62 is given in Table 2 as defined in IETF RFC 3168, which is herein incorporated by reference. The L3-IP segment 60 has other fields (not shown), such as a Differentiated Services Code Point (DSCP) field.

TABLE 2

| ECT Field | |
|---|---|
| 00 | Not ECT capable |
| 01 | ECT capable |
| 10 | ECT capable |
| 11 | Congestion Encountered |

In conventional RoCE networks the switches signal congestion by setting the ECN field 62 to the binary value 11. The packet then continues its transit through the network, and reaches a destination node. Once the destination node receives a packet whose ECN field has the binary value 11, it generates a CNP designated for the sender of the received packet. The CNP has the format shown in FIG. 3, including L2-MAC segment 66 and L3-IP segment 68. The IP addresses in L3-IP segment 68 of a CNP are the swap addresses of the L3-IP segment 60 in the received packet. The addresses of the L2-MAC segment 66 are not swapped, but remain as defined by the router, which routes the packet to the DIP (the original SIP of the packet), and which is also the source MAC of the router.

In embodiments of the invention, an intermediate fabric switch receiving a packet that experiences traffic congestion generates a congestion notification packet (CNP). Local congestion at a switch can be recognized by known methods, for example, because its queues are filled. However, instead of marking the ECN fields, a CNP is generated. The CNP is sent by the switch to the source node of the received packet. When the source node receives the CNP it reduces the traffic injection rate of the congesting flow as if the CNP had been generated from the packet destination node. The term "switch" includes network elements or nodes that have network interfaces such as NICs, in which the network elements perform the function of a switch.

The switch may be configured to handle each of the following embodiments:

First Embodiment (Nonvirtualized Networks Handling "Native Packets")

RoCEV2-compliant switches are ECN-aware, and switches indicate network congestion by marking the ECN field 62 as binary 11.

Figure 3:
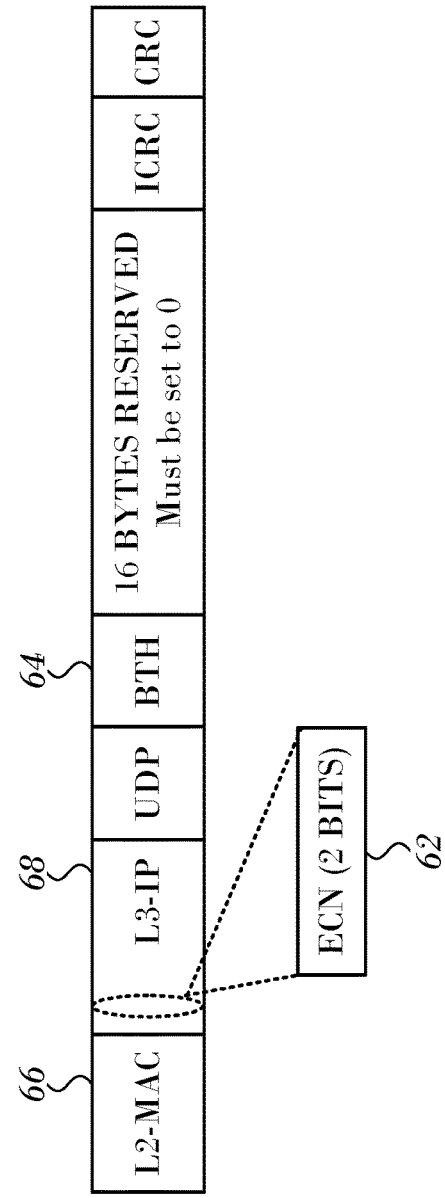
FIG. 3 is a table illustrating the format of a conventional CNP header.

Regarding the CNP, in the format of FIG. 3, fields (not shown except for ECN) in the L3-IP segment 60 are assigned as follows:

DIP=original packet SIP;
SIP=Router SIP or original packet DIP;
DSCP=dedicated high priority value to ensure the CNP reaches the source node as fast as possible;
ECN=Binary 00 (CNP are non-eligible for ECN marking).

L2-MAC segment 66 is built as defined for normal router flow in the switch. Fields of the L3-IP segment 68 are assigned according to the RoCEV2 standard.

Figure 4:
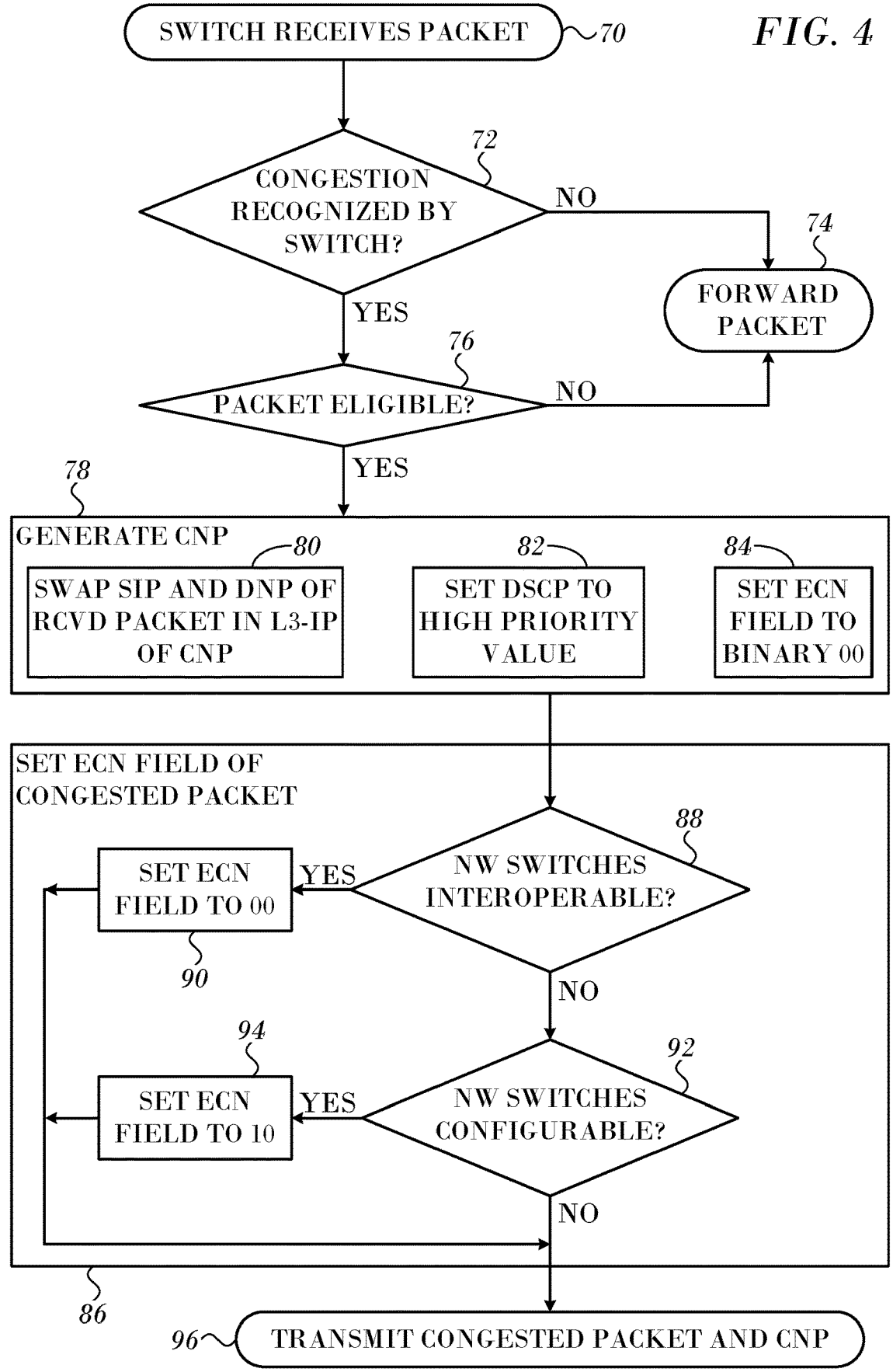
FIG. 4 is a flow chart of a method of network congestion management in accordance with an embodiment of the invention.

Reference is now made to FIG. 4, which is a flow chart of a method of network congestion management in accordance with an embodiment of the invention. The process steps are shown in a particular linear sequence for clarity of presentation. However, it will be evident that many of them can be performed in parallel, asynchronously, or in different orders. Those skilled in the art will also appreciate that a process could alternatively be represented as a number of interrelated states or events, e.g., in a state diagram. Moreover, not all illustrated process steps may be required to implement the method.

At initial step 70 RoCEV2 packet, generally belonging to a flow, is received in a network switch or other network element.

Next, at decision step 72, it is determined if a condition of network congestion at the switch exists. This determination is made by any suitable method of congestion determination known in the art. For example, the switch may monitor its internal queues. If the determination at decision step 72 is negative, then the received packet is non-congested. Control proceeds to final step 74, where the noncongested packet is forwarded or processed conventionally by the switch in accordance with its routing information.

If the determination at decision step 72 is affirmative, then control proceeds to decision step 76, where it is determined if the received packet (referred to as the "congested packet") is eligible for application of the principles of the invention. Referring again to FIG. 2 and FIG. 3, certain conditions need to be satisfied before a CNP is produced:

1) The congested packet is RoCEV2-compliant. RoCEV2 compliance requires that the ECN field in the L3-IP segment 60 is available for signaling congestion.

2) The congested packet is eligible for ECN marking. A packet having the binary value 00 in ECN field 62 is not eligible.

3) The congested packet is in fact facing congestion as discussed above.

4) The congested packet is not being dropped by the switch (excluding buffer congestion). It is an advantage that a CNP is sent to the source node even when the packet is dropped due to buffer congestion. In conventional networks in which the destination node generates the CNP, a CNP would not be generated in this case.

If the determination at decision step 76 is negative, then the procedure ends at final step 74.

If the determination at decision step 76 is affirmative, then in step 78 a CNP is generated by the switch. Step 78 comprises steps 80, 82, 84. In step 80 the DIP and SIP are read from the L3-IP segment 60 of the congested packet, then exchanged into the L3-IP segment 68 of the CNP, such that the SIP of the congested packet becomes the DIP of the CNP, and the DIP of the congested packet becomes the SIP of the CNP. In some embodiments, the IP address of the switch itself can be used as the SIP of the CNP. L2-MAC segments 58 do not undergo address swapping, but are treated as described above.

In step 82 the DSCP field of the L3-IP segment of the CNP header is set to a high priority value in order to ensure that the CNP reaches the source node of the congested packet as fast as possible.

A CNP is not eligible for ECN marking. The ECN field of the L3-IP segment of the CNP is set to binary 00 in step 84, so that the CNP is unaffected by congestion management procedures of other nodes during its transit through the network.

Once the switch has committed to generating a CNP, it would be undesirable for downstream switches to repeat the procedure when they subsequently handle the congested packet, because the packet source node would then receive multiple CNPs concerning a single packet. The packet source node might respond by throttling the flow more than necessary, possibly violate QoS requirements, and even cause the flow to become unusable at its destination.

Next, the ECN fields of the L3-IP segment of the congested packet are reset in block 86, in which one of a series of options is selected, depending on the capability of the switches in the network. The sequence begins at decision step 88, where it is determined if all switches in the network are interoperable, which in this context means that they are all capable of not applying the Weighted Random Early Detection (WRED) method to packets that are not ECN-capable, while applying ECN marking for packets that are ECN capable. WRED is a well-known queuing discipline in which packets are selectively dropped, based on IP precedence.

If the determination at decision step 88 is affirmative, then the network is ideally suited for application of the principles of the invention. Control proceeds to step 90, where the ECN field of the L3-IP segment in the congested packet is set to binary 00. For purposes of congestion management, the congested packet will be deemed ineligible in subsequent iterations of decision step 76 in downstream network nodes. Performance of step 90 insures that exactly one CNP is generated for the congested packet. This behavior resembles CNP generation by an end where all switch congestions along the path coalesce to a single CNP generation.

If the determination at decision step 88 is negative, then at decision step 92, it is determined if the network nodes are configured or configurable to recognize only a selected one of the binary values 01 and 10 as indicating packet eligibility in step 90. In the example, referred to in eligible packets are denoted by the binary value 01, while the binary value 10 (as well as the value 00) denotes ineligibility. The binary values "01" and "10" are used arbitrarily herein to distinguish packet eligibility from ineligibility. The binary values in this example have no significance with respect to the actual configuration of the method.

If the determination at decision step 92 is affirmative, then in step 94 the ECN field is set to binary 10. Network switches configured to perform step 94 generate CNP packets only for packets with the selected ECN field value indicating eligibility for CNP generation, binary 01 in this example, and prevent multiple CNP generation by setting the ECN field to indicate ineligibility. This ensures single CNP generation per packet.

If the determination at decision step 92 is negative, then the ECN field of the congested packet is left unchanged. In cases where no other switches in the path of the congested packet are experiencing congestion, there is no harm, as only one CNP will be generated. It is only where multiple network congestion points are present that the undesired effect of multiple CNPs may be experienced.

After exiting block 86 at final step 96 the congested packet is forwarded according to its routing instructions, and the CNP is transmitted through the network toward the source node of the congested packet.

Second Embodiment (Virtualized Networks Handling "Tunnel Packets")

As is known in the art, a tunneling protocol is a communications protocol that allows for the movement of data from one network to another. The payload of a tunnel packet encapsulates another packet that is compliant with another protocol, and transports the payload of the other packet. This embodiment is described with reference to the example of the protocol Virtual Extensible LAN (VXLAN), described in IETF RFC 7348, which is herein incorporated by reference. VXLAN is a Layer 2 overlay scheme on a Layer 3 network.

A RoCEV2-over-VXLAN tunnel packet (referred to as a "non-congested tunnel packet or "congested tunnel packet" as the case may be) has the format shown in FIG. 5. It includes a VXLAN segment or outer header 98. The outer header 98 encapsulates an inner header 100, the latter corresponding to an original MAC frame. The outer header 98 and inner header 100 both have an L3-IP segment, segments 102, 104, respectively, each having an ECN field as described above in the previous embodiment, and L2-MAC segment 106, 108. The L3-IP segments 102, 104 are not necessarily identical. When a non-congested switch receives and forwards a non-congested tunnel packet, i.e., the switch does not perform encapsulation or decapsulation, the non-congested tunnel packet is processed according to the ECN field of the L3-IP segment 102 in the outer header 98.

When forwarding a congested tunnel packet, the L3-IP segment 102 in the outer header 98 denotes any congestion in the underlay network. Once the packet is decapsulated, the ECN markings of the L3-IP segment 102 may be copied to the L3-IP segment 104 in the inner header 100.

A CNP-over-VXLAN has the format shown in FIG. 6. Outer header 110 includes L2-MAC segment 112 and L3-IP segment 114. Inner header 116 comprises L2-MAC segment 118 and L3-IP segment 120. In building a CNP-over-VXLAN it is necessary to deal with the outer header 110 and the inner header 116.

In the case of the inner header 116, step 78 (FIG. 3) is performed, in which the SIP and DIP of the inner headers 100, 116 are swapped. Swapping is performed separately on the L2-MAC segments 108, 118 and on the L3-IP segments 104, 120.

Regarding the outer header 110, the L2-MAC segment 112 and L3-IP segment 114 are treated in the same way as the L2-MAC segment 66 and L3-IP segment 68 of a CNP for regular RoCEV2 congested packets (step 78, FIG. 4).

Implementation Details.

One of the challenges in CNP generation is to retrieve the destination QP for the CNP.

For reliable connection transport services, the source QP is not available in the packet header of the congested packet (or congested tunnel packet). This issue can be solved by one of the following options:

A translation table may be maintained between {destination IP, destination QP} and the source QP in the switch. Such a table typically exists in an NIC, and can be exploited when it generates the CNP. It is possible to have this table in the switch; however, it may introduce scale issues. In addition, a central network controller needs to be aware of the entire network to configure the switch.

Instead of using the QP the NIC maps a CNP to a congestion control context by another field. A typical solution is to calculate a hash function on the following fields:

Destination IP (of the original packet, which is the SIP of the CNP packet); and Destination QP of the original packet.

This option requires that the CNP packet reports this destination QP. As the source QP of the original packet is not available (otherwise there is no issue) the switch will report the destination QP in the CNP.

In a reliable connection transport service, the source node may use IP or other alternatives such as a hash table to correlate between a packet and its congestion control context.

Conventionally, when the destination node generates the CNP, the destination QP of the CNP packet (which is the source QP of the congested packet) is retrieved from a lookup table on the destination QP of the congested packet. This is used for reliable transport services, where the source QP is not denoted in the packet. While this approach can be used by an intermediate switch, it is more difficult to scale up than the above options.

It will be appreciated by persons skilled in the art that the present invention is not limited to what has been particularly shown and described hereinabove. Rather, the scope of the present invention includes both combinations and sub-combinations of the various features described hereinabove, as well as variations and modifications thereof that are not in the prior art, which would occur to persons skilled in the art upon reading the foregoing description.

The invention claimed is:

1. A method of communication, comprising the steps of:
sending packets over a network from a source network interface toward a destination network interface;
receiving one of the packets in an intermediate switch of the network;
determining that the intermediate switch is experiencing network congestion;
generating in the intermediate switch a congestion notification packet for the received packet;
transmitting the congestion notification packet from the intermediate switch to the source network interface via the network;
responsively to the congestion notification packet modifying a rate of packet transmission to the destination network interface from the source network interface;
forwarding the received packet from the intermediate switch toward the destination network interface; and
prior to forwarding the received packet:
determining whether all other intermediate switches are capable of transmitting congestion notification packets to the source network interface;
responsive to determining that all other intermediate switches are capable of transmitting congestion notification packets to the source network interface, marking the received packet in a first manner indicating that the received packet is ineligible to cause other intermediate switches of the network to generate and transmit new congestion notification packets; and
responsive to determining that less than all other intermediate switches are capable of transmitting congestion notification packets to the source network interface, marking the received packets in a second manner.

2. The method according to claim 1, wherein the received packet is RoCEV2-compliant.

3. The method according to claim 1, wherein the received packet is a tunnel packet.

4. The method according to claim 1, wherein sending and receiving the packets are performed using a source queue pair (source QP) and a destination queue pair (destination QP), respectively, wherein the step of generating comprises obtaining the source QP by maintaining in the intermediate switch a translation table between the destination QP and the source QP.

5. The method according to claim 1, wherein sending and receiving the packets are performed using a source queue pair (source QP) and a destination queue pair (destination QP), respectively, wherein the step of generating comprises calculating a hash function on a destination address and the destination QP of the received packet.

6. A communication apparatus, comprising:
a source network interface;
a destination network interface, wherein the source network interface is operative for sending packets over a network toward the destination network interface and the destination network interface is operative for accepting the packets from the source network interface; and
an intermediate switch in the network that receives one of the packets, the intermediate switch being operative for:
determining that the intermediate switch is experiencing network congestion;
generating a congestion notification packet for the received packet;
transmitting the congestion notification packet to the source network interface via the network; and
forwarding the received packet toward the destination network interface via at least one other intermediate switch,
wherein responsively to the congestion notification packet the source network interface is operative for modifying a rate of packet transmission to the destination network interface,
and the intermediate switch is also operative for, prior to forwarding the received packet:
determining whether all other intermediate switches are capable of transmitting congestion notification packets to the source network interface;
responsive to determining that all other intermediate switches are capable of transmitting congestion notification packets to the source network interface, marking the received packet in a first manner indicating that the received packet is ineligible to cause other intermediate switches of the network to generate and transmit new congestion notification packets; and
responsive to determining that less than all other intermediate switches are capable of transmitting congestion notification packets to the source network interface, marking the received packets in a second manner.

7. The apparatus according to claim 6, wherein the received packet is RoCEV2-compliant.

8. The apparatus according to claim 6, wherein the received packet is a tunnel packet.

9. The apparatus according to claim 6, wherein sending the packets from the source network interface and accepting the packets in the destination network interface are performed using a source queue pair (source QP) and a destination queue pair (destination QP), respectively, wherein the step of generating comprises obtaining the source QP by maintaining in the intermediate switch a translation table between the destination QP and the source QP.

10. The apparatus according to claim 6, wherein sending the packets from the source network interface and accepting the packets in the destination network interface are performed using a source queue pair (source QP) and a destination queue pair (destination QP), respectively, wherein the step of generating comprises calculating a hash function on a destination address and the destination QP of the received packet.

* * * * *